US007626732B2

(12) United States Patent
Grinberg et al.

(10) Patent No.: US 7,626,732 B2
(45) Date of Patent: Dec. 1, 2009

(54) INSPECTION OF A PRINTING CYLINDER

(75) Inventors: Tsafir Grinberg, Ramat Hasharon (IL); Gadi Harpaz, Hod Hasharon (IL); Omri Govrin, Eshar (IL); Yoram Hasidi, Beit Arieh (IL); Arkadi Machtei, Kfar Saba (IL)

(73) Assignee: Elbit Vision Systems Ltd., Qadima (IL)

( * ) Notice: Subject to any disclaimer, the term of this patent is extended or adjusted under 35 U.S.C. 154(b) by 581 days.

(21) Appl. No.: 11/583,146

(22) Filed: Oct. 19, 2006
(Under 37 CFR 1.47)

(65) Prior Publication Data

US 2007/0240597 A1 Oct. 18, 2007

Related U.S. Application Data

(63) Continuation-in-part of application No. 11/254,982, filed on Oct. 20, 2005, now abandoned.

(51) Int. Cl.
*B41C 1/02* (2006.01)
*B41C 1/04* (2006.01)
*G06K 15/00* (2006.01)
*H04N 1/40* (2006.01)
*G06F 15/00* (2006.01)

(52) U.S. Cl. ...................................... 358/3.29; 358/1.1

(58) Field of Classification Search ................. 358/1.1, 358/1.4, 1.6, 3.29; 382/141, 112
See application file for complete search history.

(56) References Cited

U.S. PATENT DOCUMENTS 5,652,804 A * 7/1997 Bronstein et al. ........... 382/141
6,975,754 B2 * 12/2005 Hiroi et al. .................. 382/149

* cited by examiner

*Primary Examiner*—Douglas Q Tran
(74) *Attorney, Agent, or Firm*—EMPK & Shiloh, LLP

(57) ABSTRACT

The disclosure relates generally to the field of printing. More specifically, the disclosure relates to an inspecting process for a printing cylinder.

13 Claims, 7 Drawing Sheets

INSPECTION OF A PRINTING CYLINDER

This Patent application is a Continuation-In-Part of U.S. patent application Ser. No. 11/254,982, filed on Oct. 20, 2005 now abandoned the content of which is incorporated herein by reference in its entirety.

FIELD OF THE DISCLOSURE

The disclosure generally relates to the field of printing. More specifically, the disclosure relates to a method and system for automatically detecting defects in a printing cylinder during its fabrication process. The disclosure further relates to a process for fabricating a printing cylinder, and for inspecting a printing cylinder after its fabrication.

BACKGROUND

Several printing techniques are widely used in the printing industry, among which is a printing technique known in the printing field as "Gravure press" and "rotogravure printing".

Typically, the manufacturing of a gravure printing cylinder involves coating a cylindrical metal base (for example steel) with an "image carrier" (for example copper); polishing the surface of the image carrier; engraving (such as by etching) the image on the image carrier; coating the image carrier with wear-proof layer (for example Chrome plating) to increase the print durability of the printing cylinder; and polishing the wear-proof layer.

During printing, the printing cylinder is immersed in a bath of fluid ink and as it rotates in the bath, ink fills the tiny cells and covers the surface of the cylinder. At a certain point, while the cylinder keeps on turning, the excess ink is wiped off the cylinder by a flexible steel doctor blade which leaves the non-image area clean while the ink remains in the recessed cells. The ink remaining in the recessed cells forms the image by direct transfer to the substrate (paper or other material) as it passes between the plate cylinder and the impression cylinder. The ink is drawn out of the cells onto the substrate by capillary action at the point of contact. In many cases, gravure printing is done using engraved copper cylinders protected from wear by the application of a thin electroplate of chromium. Gravure printing generally consists of a printing cylinder, a rubber covered impression roll, an ink fountain, a doctor blade, and a means of drying the ink. The major unit operations in a gravure printing operation are (i) Image preparation; (ii) Cylinder preparation; (iii) Printing, and (iv) Finishing.

Gravure press offers an outstanding print quality, output consistency, high versatility and printing speed. Gravure press also allows producing excellent and constant reproductions throughout each print run. Gravure press is a relatively simple printing process that can produce millions of high quality copies at high speed. Nevertheless, defects may occur at any fabrication step of the printing cylinder, and thus, it would be advantageous to visually inspect the printing cylinder throughout its fabrication process. In order to significantly reduce costs involved in the fabrication of defective printing cylinders, the printing cylinders require a careful scrutiny throughout various steps of their fabrication process. In cases where defects are minor or located in non-critical positions (depending on the patterning scheme), the printing cylinder may be used after removing, or fixing, the defects, or with the defects. In cases of major or critically located defects, it may be decided that the printing cylinder will not be used.

SUMMARY OF THE DISCLOSURE

The following embodiments and aspects thereof are described and illustrated in conjunction with systems, tools and methods, which are meant to be exemplary and illustrative, not limiting in scope. In various embodiments, one or more of the above-described problems have been reduced or eliminated, while other embodiments are directed to other advantages or improvements.

The present disclosure provides a method for detecting defects on an engravable material, the material being the peripheral surface of, for example a printing cylinder. The defect detection method may include acquiring an image of an engravable material, wherein the engravable material is the peripheral surface of a printing cylinder; and performing a morphological analysis of the image for detecting defects on the engravable material. In an embodiment of the present disclosure provides the method of the present disclosure may be used in the fabrication process of a printing cylinder.

The present disclosure further provides a system for detecting defects on an engravable material, the material being the peripheral surface, for example of a printing cylinder. The system may include a moveable image acquiring apparatus for outputting, at different stages of the fabrication process, data related to an image of an engravable material, the apparatus may be capable of moving forwards and backwards along an imaginary line that is essentially parallel to the rotation axis of the cylinder, a controllable mechanism, for rotating the cylinder and operating the image acquiring apparatus, and a controller functionally coupled to the controllable mechanism for causing the controllable mechanism to rotate the cylinder and move the image acquiring apparatus in synchronization. The controller may be configured to receive or accept data related or associated to acquired image(s), process the data and output data related to, or associated with, defects in the engravable material, as detected through processing of the acquired image(s)).

In an embodiment of the present disclosure there is provide a printing cylinder fabrication process designed to enable detection of defects in various steps of the fabrication process, the process may include acquiring an image of the periphery of the printing cylinder after each preferred, selected, required or desired fabrication step, and performing a morphological analysis on an individual image, or a set of images, for detecting defects at various steps of the printing cylinder's fabrication process.

In addition to the exemplary aspects and embodiments described above, further aspects and embodiments will become apparent by reference to the figures and by study of the following detailed description.

BRIEF DESCRIPTION OF THE DRAWINGS

Exemplary embodiments are illustrated in referenced figures. It is intended that the embodiments and figures disclosed herein be considered illustrative, rather than restrictive. The disclosure, however, both as to organization and method of operation, together with objects, features, and advantages thereof, may best be understood by reference to the following detailed description when read with the accompanying figures, in which.

Figure 1:
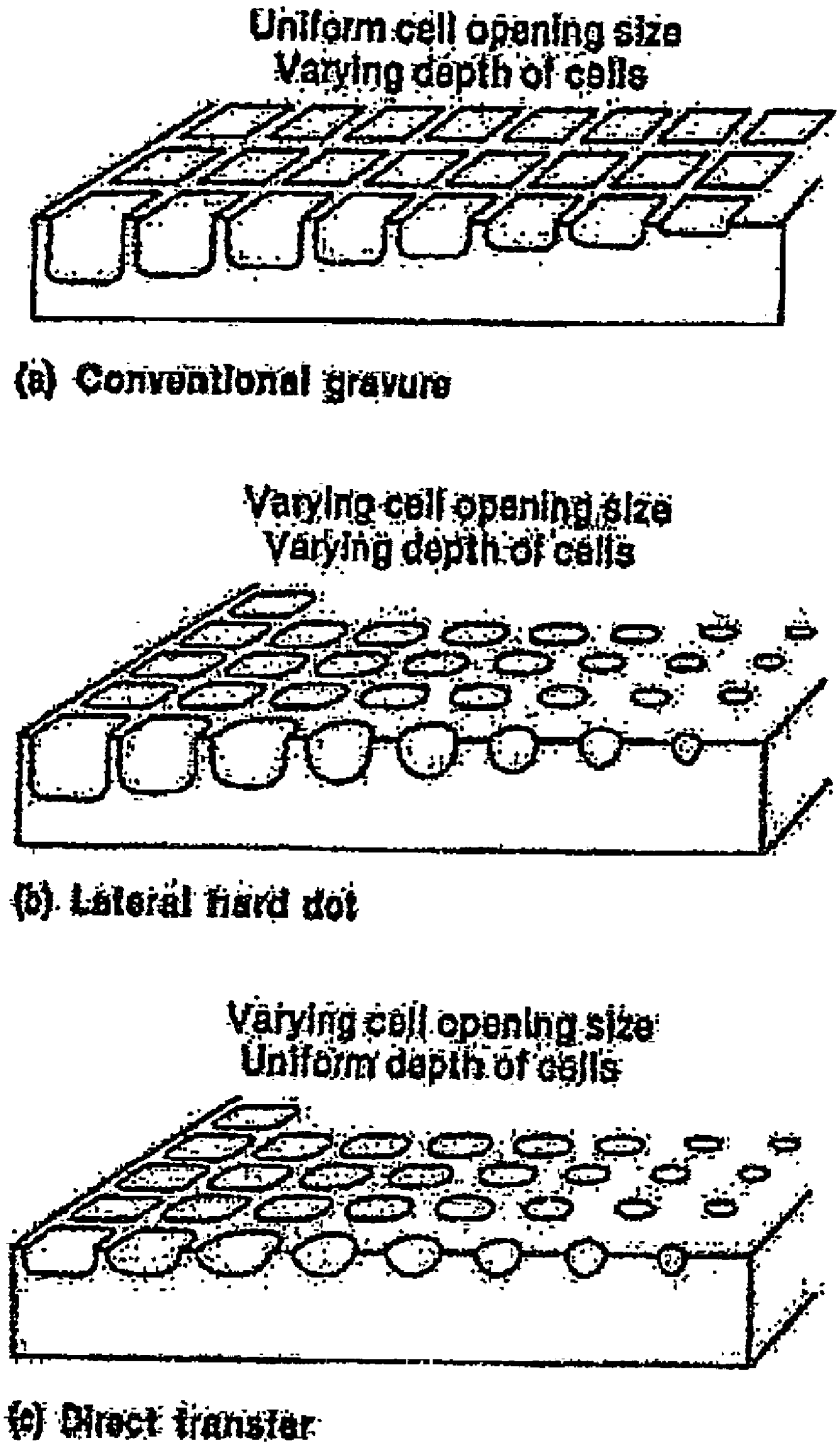
FIG. 1 (prior art)
FIG. 1 (prior art) shows different types of cells.

It will be appreciated that for simplicity and clarity of illustration, elements shown in the figures have not necessarily been drawn to scale. For example, the dimensions of some of the elements may be exaggerated relative to other elements for clarity. Also, at times singular or plural (or options between singular and plural) may be described, however, notations or descriptions of singular include, or is to be construed as, plural, and plural include, or is to be construed as singular where possible or appropriate.

DETAILED DESCRIPTION

In the following detailed description, numerous specific details are set forth in order to provide a thorough understanding of the disclosure. However, it will be understood by those skilled in the art that the disclosure may be practiced without these specific details. In other instances, well-known methods, procedures, components and circuits have not been described in detail so as not to obscure the disclosure.

Unless specifically stated otherwise, as apparent from the following discussions, it is appreciated that throughout the specification discussions utilizing terms such as "processing", "computing", "calculating", "determining", or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

The disclosure may take the form of an entirely hardware embodiment, an entirely software embodiment or an embodiment containing both hardware and software elements. In a preferred embodiment, the disclosure is implemented in software, which includes but is not limited to firmware, resident software, microcode, etc.

Embodiments of the disclosure may include apparatuses for performing the operations described herein. This apparatus may be specially constructed for the desired purposes, or it may include a general-purpose computer selectively activated or reconfigured by a computer program stored in the computer.

Furthermore, the disclosure may take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium may be an electronic, magnetic, optical, electromagnetic, infrared, or semiconductor system (or apparatus or device) or a propagation medium. Examples of a computer-readable medium include a semiconductor or solid state memory, magnetic tape, magnetic-optical disks, a removable computer diskette, a random access memory (RAM), a read-only memory (ROM), a rigid magnetic disk, an optical disk, electrically programmable read-only memories (EPROMs), electrically erasable and programmable read only memories (EEPROMs), magnetic or optical cards, or any other type of media suitable for storing electronic instructions, and capable of being coupled to a computer system bus. Current examples of optical disks include compact disk-read only memory (CD-ROM), compact disk-read/write (CD-R/W) and DVD.

A data processing system suitable for storing and/or executing program code may include at least one processor coupled directly or indirectly to memory elements through a system bus. The memory elements may include local memory employed during actual execution of the program code, bulk storage, and cache memories which provide temporary storage of at least some program code in order to reduce the number of times code has to be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The processes and displays presented herein are not inherently related to any particular computer or other apparatus. Various general purpose systems may be used with programs in accordance with the teachings herein, or it may prove convenient to construct a more specialized apparatus to perform the desired method. The desired structure for a variety of these systems will appear from the description below. In addition, embodiments of the disclosure are not described with reference to any particular programming language. It will be appreciated that a variety of programming languages may be used to implement the teachings of the disclosures as described herein.

In an embodiment of the present disclosure a method is provided for detecting defects on an engravable material, the material being the peripheral surface, for example of a printing cylinder, the method may include, among other things, acquiring an image of an engravable material, wherein the material is the peripheral surface of a printing cylinder and performing a morphological analysis of the image thereby detecting defects on the engravable material.

In an embodiment of the present disclosure the term "engravable material" may refer to an "image carrier". In another embodiment of the present disclosure the term "engravable material" may refer to an "engravable coating". In an embodiment of the present disclosure the term "image carrier" may refer to any substance upon which cells are, or may be, located, such as by being etched or engraved. In another embodiment, the cells are designed to be filled with ink or any other liquid suitable for printing.

In one embodiment of the disclosure, the term "defect" may refer to an imperfect cell. In another embodiment, the term "defect" may refer to an imperfect wall between cells. In another embodiment, the term "defect" may refer to any form, shape or change in the inspected surface that is not related to a known patterning scheme. In another embodiment, the term "defect" may refer to any imperfection in the inspected surface. In another embodiment, the term "defect" may refer to an artifact suspected to be a defect.

In one embodiment of the disclosure, the term "patterning scheme" may refer to a printing scheme. In another embodiment, the term "patterning scheme" may refer to a coating scheme. In another embodiment, the term "patterning scheme" may refer to an ink-layering scheme.

In an embodiment of the disclosure, the engravable material may include, among other things, a metal. In another embodiment, the metal may include, among other things, copper, aluminum, zinc or a combination thereof. In another embodiment, the material may be processed to increase the level of smoothness. In another embodiment, the material may be finished to form a high quality surface. In another embodiment, the material may be polished. In one embodiment of the disclosure, the engravable material may further include, among other things, a polymer. In another embodiment, the polymer may further include, among other things, rubber.

In an embodiment of the disclosure the engravable material may include a plurality of cells engraved on the material according to a predetermined patterning scheme. In another embodiment, the cells are engraved into the material using mechanical, electromechanical or laser techniques, or any combination thereof. In another embodiment, the cells are engraved into the material by means of etching into the material using a pattern-generating layer, or transfer layer. In one embodiment of the disclosure, the terms "pattern-generating layer" and "transfer layer" may both refer to a processable layer of substance that is applied to a surface of an object for creating in the layer a latent graphical image of interest, or a 'negative, or complimentary, image thereof. Once processed, for example by being exposed to a source of energy, the graphical image of interest is rendered visible on the surface of the object. Photo resist, lacquer and "black varnish" are exemplary materials useable as transfer layer. In one embodiment of the disclosure, the term "image" may refer to a digital image.

In an embodiment of the disclosure, the engravable material may include a wear-proof layer. In another embodiment, the wear-proof layer may include a metal. In another embodiment, the metal may include chromium or any other appropriate substance suitable as, or suitable for forming, a wear-proof layer.

In one embodiment of the disclosure, the engravable material may include a pattern-generating layer. In another embodiment, the pattern-generating layer may include a photoresist layer. In another embodiment, the engravable material may include a transfer layer.

According to some embodiments of the disclosure, detecting defects in respect of the plurality of cells may include analyzing the pattern of the cells, for example by comparing the actual pattern of the cells to a known, or expected, pattern. The expected, or known, pattern of cells may be known from the patterning scheme, which defines the characteristics and pattern of cells based on the intended printing results.

In one embodiment of the disclosure, the step of performing the morphological analysis may include use of a predefined set of characteristics, or characteristics, to identify defective cells and the position thereof. In another embodiment, the predefined set of characteristics may include: pattern regularity, dimensions of cells, shape of cells, cross-sectional area of cells, bridges between adjacent cells, distance between adjacent cells, depth of cells or any combination thereof. In another embodiment, the step of performing the morphological analysis may include the step of comparing the image to a reference image, wherein the reference image is obtained from the patterning scheme, thereby locating the position of defective cells on the engravable material. In another embodiment, the step of performing the morphological analysis may include the step detecting defects on the surface of the metal. In another embodiment, the step of performing the morphological analysis may include the step detecting defects related to non-uniformity of the thickness and/or surface of the pattern-generating layer.

According to one embodiment of the disclosure, a first image of the peripheral surface of the image carrier may be acquired after polishing the image carrier, to detect defects such as scratches. According to another embodiment, a second image may also be acquired, of the surface of the image carrier after a plurality of cells are engraved into the material according to a patterning scheme of interest. According to another embodiment, a morphology analysis may be performed by a software-driven application, in respect of the acquired first and second images, to detect artifacts and/or imperfections suspected to be defects in the peripheral surface and in cells, respectively. According to another embodiment, digital signal processing tools may be utilized for this purpose. According to another embodiment a defect call may be generated by digital processing tools. By "defect call" is meant herein a Boolean-like decision result ("TRUE" or "FALSE") regarding the possibility that a suspected defect is indeed a defect (in which case the decision result will be "TRUE"), and, in some cases, that a suspected defect is indeed a defect of a specified kind (for example a pinhole). Otherwise (the suspected defect is not a real defect), the decision result will be "FALSE". For example, for 10 suspected defects the inspection system may output (after employing, for example corresponding digital signal processing (DSP) tools) a "TRUE" result for 6 of the 10 suspected defects and a "FALSE" result for the remaining 4 suspected defects.

According to another embodiment, the defect calls may be verified automatically by using additional data and software tools to further analyze imperfections and artifacts associated with a printing cylinder. According to another embodiment, the additional data may be acquired by using additional imaging modalities or scanners, such as X-Ray, ultrasound or Eddy current. According to another embodiment, additional visual data may be acquired by using different image acquisition or scanning parameters, such as resolution, light wavelength, illumination or optical shutter speed. According to another embodiment, additional processing tools may be used for verification. According to another embodiment, a human verification step may be used instead or after the automatic verification.

A cylinder fabrication process may include a step of coating the plurality of cells and "bridges" therebetween with a wear-proof layer, such as chromium. According to one embodiment, the method of the disclosure may further include acquiring a third image of the wear-proof layer and detecting defects in respect of the wear-proof layer by analyzing the third image.

The cells may be engraved into the material by being etched into the material while using a layer of photoresist substance for this purpose, or any other appropriate pattern-generating substance. In the latter case, according to embodiments of the disclosure, the method may further include acquiring a forth image of the photoresist layer and detecting defects in respect of the thickness non-uniformity and surface unity of the layer by analyzing the forth image.

According to some embodiments of the disclosure, detecting defects in respect of the plurality of cells may include use of a predefined set of characteristics to identify imperfect cells, and indication of the positions of the imperfect cells on the material. The predefined set of characteristics may refer, for example to pattern regularity; desired dimensions of cells; desired shape of cells; desired cross-sectional area of cells; 'bridges' between adjacent cells; desired distance between adjacent cells and desired depth of cells.

According to other embodiments of the disclosure, detecting defective cells may include comparing data derived from the second image to a reference image data that is derived from the patterning scheme.

According to other embodiments of the disclosure, detecting defects in respect of the plurality of cells may include both use of a predefined set of characteristics to identify imperfect cells and verifying suspected defective cells by comparing data that is derived from the second image to a reference image data that is derived from the patterning scheme.

The disclosure also provides, in accordance with some embodiments, a process for fabricating a printing cylinder that utilizes the defects detection method described herein. In an embodiment of the present disclosure there is provided a printing cylinder fabrication process designed to enable the detection of defects in an engravable material, the material being, for example, the peripheral surface of a printing cylinder. The process may include acquiring an image of an engravable material, wherein the material is the peripheral surface of a printing cylinder and performing a morphological analysis of the image, thereby detecting defects on the engravable material.

In one embodiment of the disclosure, the engravable material may include a metal. In another embodiment, the metal may include copper, aluminum, zinc or a combination thereof. In another embodiment, the material may be processed to increase the level of smoothness. In another embodiment, the material may be polished. In one embodiment of the disclosure, the engravable material may further include a polymer. In another embodiment, the polymer may further include rubber.

In one embodiment of the disclosure, the engravable material may include a plurality of cells engraved on the material according to a predetermined patterning scheme. In another embodiment, the cells are engraved into the material using mechanical, electromechanical or laser techniques, or any combination thereof. In another embodiment, the cells are engraved into the material by means of etching into the material using a pattern-generating layer.

In an embodiment of the disclosure, the engravable material may include a wear-proof layer. In an embodiment, the wear-proof layer may include a metal. In an embodiment of the present disclosure the metal may include chromium or any other appropriate substance that may be used to form a wear-proof layer. In an embodiment of the present disclosure the engravable material may include pattern-generating layer. In another embodiment, the pattern-generating layer may include a photoresist layer. In an embodiment of the present disclosure the engravable material may include a transfer layer.

According to some embodiments of the disclosure, detecting defects in respect of the plurality of cells may include analyzing the pattern of the cells, for example by comparing the pattern to a known, or expected, pattern. The expected, or known, pattern of cells may be known from the patterning scheme, which defines the characteristics and pattern of cells based on the intended or planned printing results.

In one embodiment of the disclosure, the step of performing the morphological analysis may include a use of a predefined set of characteristics to identify defective cells and the position thereof. In another embodiment, the predefined set of characteristics may include pattern regularity, dimensions of cells, shape of cells, cross-sectional area of cells, bridges between adjacent cells, distance between adjacent cells, depth of cells or any combination thereof. In another embodiment, the step of performing the morphological analysis may include the step of comparing the image to a reference image, wherein the reference image is obtained from the patterning scheme, thereby locating the position of defective cells on the engravable material. In another embodiment, the step of performing the morphological analysis may include the step detecting defects on the surface of the metal. In another embodiment, the step of performing the morphological analysis may include the step detecting defects related to non-uniformity of the thickness and/or surface of the pattern-generating layer.

In one embodiment of the disclosure, the process according to the disclosure may further include the step of coating the engravable material on the peripheral surface of the printing cylinder prior to the step of acquiring the image.

In one embodiment of the disclosure, the process according to the disclosure, may further include the step of engraving into the engravable material a plurality of cells according to a predefined patterning scheme.

In one embodiment, the disclosure provides a cylinder fabrication process, the process is designed to enable the detection of defects on an engravable material, the material being the peripheral surface of a printing cylinder, the process may include coating the engravable material on the peripheral surface of the printing cylinder, polishing the material and acquiring a first image thereof, analyzing the first image to detect defects in the polished material, engraving into the polished material a plurality of cells according to a patterning scheme of interest and acquiring a second image of the plurality of cells, and analyzing the second image to detect defects in the plurality of cells. In another embodiment the fabrication process may further include coating the image carrier with a wear-proof layer, acquiring a third image of the wear-proof layer and detecting defects thereon by analyzing the third image.

In one embodiment, the cylinders according to the disclosure may be from 1 cm to 10 m in diameter. In another embodiment, the cylinders according to the disclosure may be from 2 cm to 5 m in diameter. In another embodiment, the cylinders according to the disclosure may be from 5 cm to 1 m in diameter. In another embodiment on, the cylinders according to the disclosure may be from 7.5 cm to 1 m in diameter. In another embodiment, the cylinders according to the disclosure may be between 1 centimeters (cm) and 10 cm in diameter. In another embodiment, the cylinders according to the disclosure may be between 10-100 cm in diameter. In another embodiment, the cylinders according to the disclosure may be between 1-3 m in diameter. In one embodiment, the cylinders according to the disclosure may have a diameter within the range of 1 cm to 10 meter. In another embodiment, the cylinders according to the disclosure may be from 5 cm to 7 m wide. In another embodiment, the cylinders according to the disclosure may be from 10 cm to 5 m wide. In another embodiment, the cylinders according to the disclosure may be from 20 cm to 3 m wide. In another embodiment, the cylinders according to the disclosure may be from 50 cm to 1 m wide. In one embodiment, the cylinders according to the disclosure may be from 7.5 cm in diameter by 5 cm wide to 0.9 m in diameter by 6 m wide. In one embodiment of the disclosure, the rotogravure presses for publication gravure may run at least at 15 meters per second. In another embodiment, the width of the paper used for printing may be 3.5 m or more.

Figure 2:
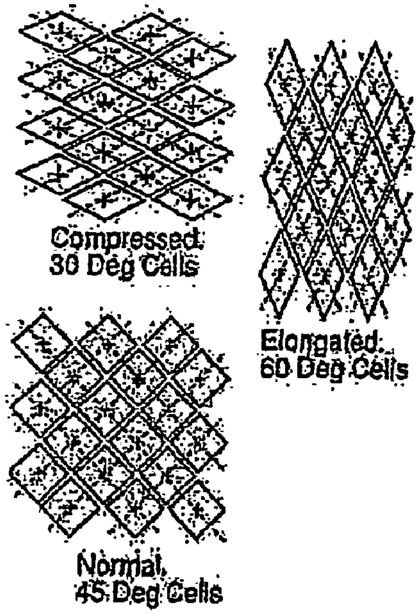
FIG. 2 (prior art)
FIG. 2 (prior art) shows different shapes of cells.
Figure 3:
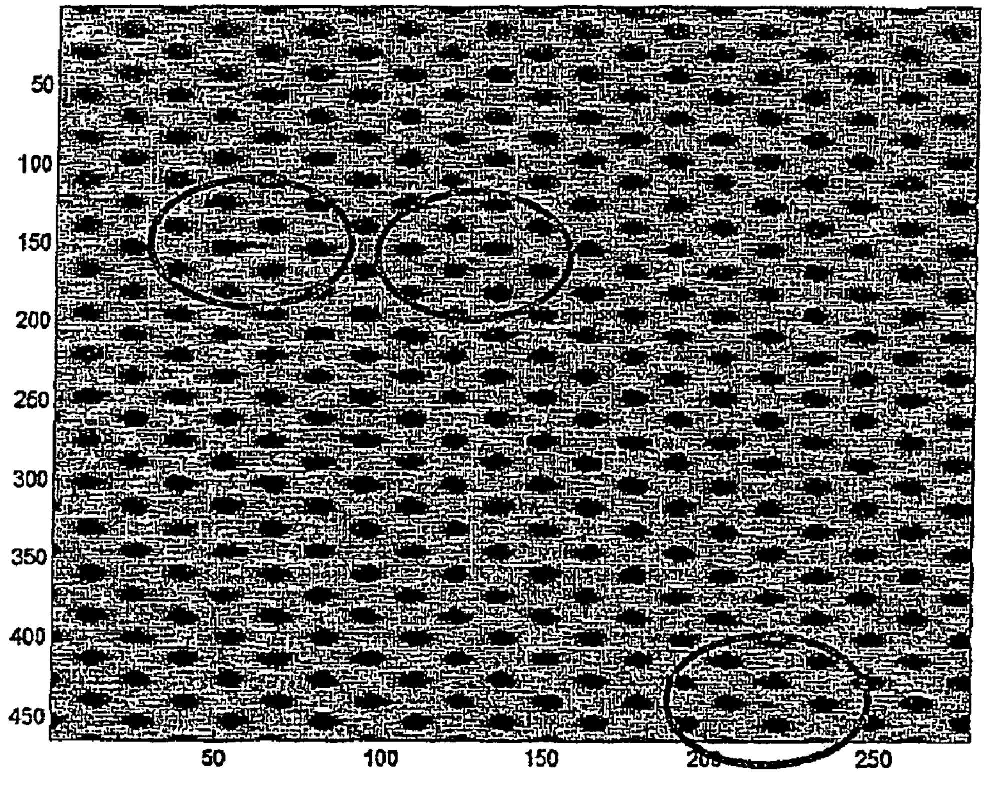
FIG. 3 shows exemplary pinholes-like defects between cells.
Figure 4:
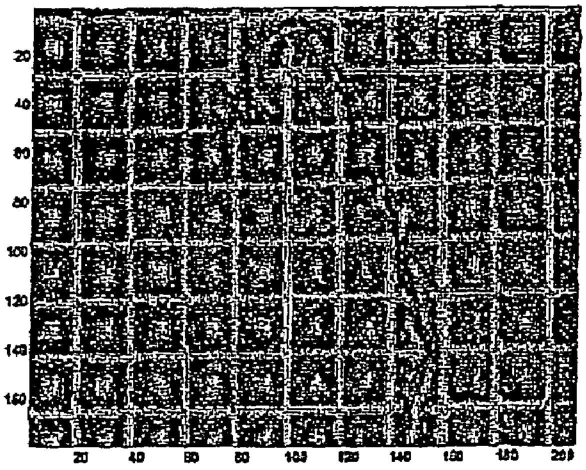
FIG. 4 shows an exemplary scratch-like defect traversing several cells.

Each cell engraved in the engravable material (for example in copper) is intended to have specific characteristics such as depth, cross-sectional area and shape, as exemplified by FIGS. 1*a* to 1*c* and in FIG. 2, which are dictated by the patterning scheme of interest. That is, the characteristics of the cells and the pattern of group(s) of cells correspond to the wanted print out and colors' tone thereof. In one embodiment of the disclosure, the printing cylinder may be fabricated in several fabrication steps, and various types of defects may occur at any one of the fabrication steps. Exemplary defects are holes in the copper coating known as "pinholes" (shown in FIG. 3), scratches (shown in FIG. 4), variations in the cylinder circumference, non-uniformity of the cylinder's peripheral surface, dust particles in the air that impair the development process of the photoresist layer, streak stains, grinding marks, air bubbles, cracks in the photoresist layer, and so on.

Defects may be caused by dust or gas bubbles that may reside in the copper plating and by small particles in the photo-resist coating. The size of defects may vary. In one embodiment, the size of defects that can be detected according to the disclosure ranges between 0.1-1 microns. In another embodiment, the size of defects that can be detected according to the disclosure ranges between 1-5 microns. In another embodiment, the size of defects that can be detected according to the disclosure ranges between 3-10 microns. In another embodiment, the size of defects that can be detected according to the disclosure ranges between 5-20 microns. In another embodiment, the size of defects that can be detected according to the disclosure ranges between 10-50 microns. In another embodiment, the size of defects that can be detected according to the disclosure is 50 microns or more. Defects of relatively large sizes may detrimentally affect the resulting printing results, whereas defects of relatively smaller sizes (for example 1-2 microns) may have little or no detrimental effects. Unwanted changes in the characteristics of the cells may degrade the quality of the resulting prints up to the extent that it may be decided not to use the defective printing cylinder. In other cases, and where applicable, defects may be removed, or fixed, after performing time-consuming and costly correction measures.

The engraving may be done by using a photoresist layer to etch the cells, and the fabrication process may further include, according to some embodiments of the present disclosure, acquiring a forth image; that is, an image of the photoresist layer, and detecting defects thereon by analyzing the forth image.

Of course, an image analysis step may be conveniently performed at any desired stage. For example, an image analysis step may be performed either immediately after acquiring an individual corresponding image or at a later stage, for example after acquiring all the images of interest.

In one embodiment, the disclosure provides a system for detecting defects associated with the fabrication process of a printing cylinder. The disclosure provides, according to one embodiment, a system for detecting defects on an engravable material, the material being the peripheral surface of a printing cylinder, the system may include a moveable image acquiring apparatus for outputting, at different stages of the fabrication process, data related to an image of an engravable material, the material being the peripheral surface of a printing cylinder, the apparatus is capable of moving forwards and backwards along an imaginary line that is essentially parallel to the rotation axis of the cylinder, a controllable mechanism, for rotating the cylinder and operating the image acquiring apparatus, and a controller, functionally coupled to the controllable mechanism for causing it to rotate the cylinder and move the image acquiring apparatus in synchronization, wherein the controller is configured to receive the data related to the image and to output data related to the detection of defects on the engravable material.

In one embodiment of the disclosure, the engravable material may include a metal. In another embodiment, the metal may include copper, aluminum, zinc or a combination thereof. In another embodiment, the metal may polished. In one embodiment of the disclosure, the engravable material may further include a polymer. In another embodiment, the polymer may further include rubber.

In one embodiment of the disclosure, the engravable material may include a plurality of cells engraved on the material according to a predetermined patterning scheme. In another embodiment, the cells are engraved into the material using mechanical, electromechanical or laser techniques, or any combination thereof. In another embodiment, the cells are engraved into the material by means of etching into the material using a pattern-generating layer.

In one embodiment of the disclosure, the engravable material may include a wear-proof layer. In another embodiment, the wear-proof layer may include a metal. In another embodiment, the metal may include chromium or any other appropriate substance that may be used to form a wear-proof layer. In one embodiment of the disclosure, the engravable material may include pattern-generating layer. In another embodiment, the pattern-generating layer may include a photoresist layer. In another embodiment, the engravable material may include a transfer layer.

In one embodiment of the disclosure, the controller uses a predefined set of characteristics to identify defective cells and the position thereof. In another embodiment, the predefined set of characteristics may include pattern regularity, dimensions of cells, shape of cells, cross-sectional area of cells, bridges between adjacent cells, distance between adjacent cells, depth of cells or any combination thereof. In another embodiment, the controller is configured to locate the position of defective cells on the engravable material by comparing data representative of the image of the engravable material to data representative of a reference image, wherein the reference image is obtained from the patterning scheme. In another embodiment, the controller is configured to detect defects on the surface of the metal. In another embodiment, the controller is configured to detect defects related to non-uniformity of the thickness and/or surface of the pattern-generating layer.

Figure 5:
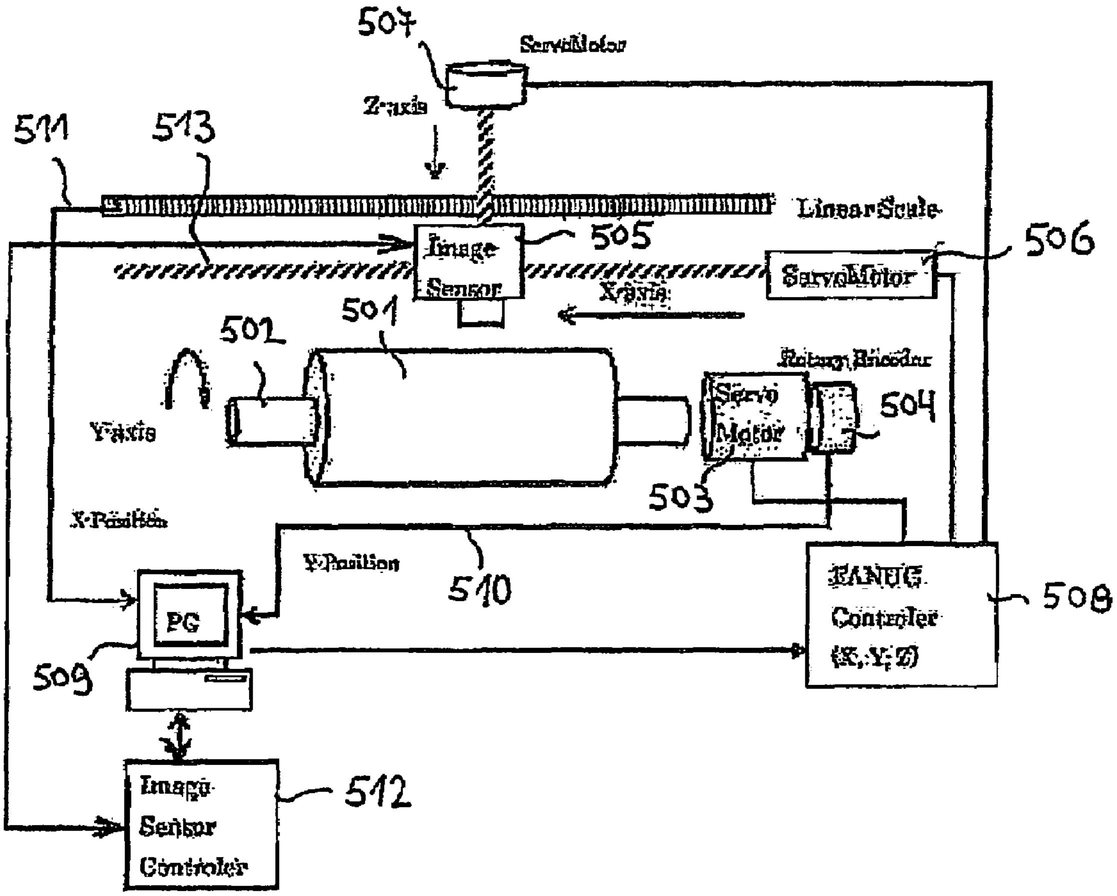
FIG. 5 schematically illustrates the defects detection system in accordance with some embodiments of the present disclosure.

Referring now to FIG. 5, in accordance to embodiments of the disclosure, the system may include a moveable image acquiring apparatus ("IAA") 505 that may be moveably and closely positioned opposite the printing cylinder 501 for outputting, at different stages of the fabrication process, signals representative of a first, second, third and fourth images. The first, second, third and fourth images may be acquired from the image carrier after it is polished, from the image carrier after cells are engraved in it, from wear-proof layer and from the photoresist layer (if the engraving is done using etching). The image acquiring apparatus 505 may move forwards and backwards along a line 513 that is essentially parallel to the rotation axis of the printing cylinder. The system may further include a controllable mechanism (shown at 508) for rotating a printing cylinder (shown at 501) and for operating the image acquiring apparatus (shown at 505).

The system may further include, in accordance to embodiments of the disclosure, a computer 509 that may be functionally coupled to the controllable mechanism 508 for causing it to rotate the cylinder 501and move the image acquiring apparatus 505 in synchronization. The computer 509 may cause the image acquiring apparatus 505 to forward to it the signals in synchronization with the positions of the image acquiring apparatus 505 relative to the printing cylinder 501. The computer 509 may then analyze the signals to detect defects in the polished image carrier, engraved image carrier, wear-proof layer and photo-resist layer.

Cylinder 501 may typically consist of a base metal (e.g., steel) coated with an image carrier (e.g., copper layer, not shown). Cylinder 501 is rotateable about longitudinal axis 502. Cylinder 501 may be mechanically supported so as to allow cylinder 501 to rotate about axis 502. Servomotor 503 may provide the mechanical power required for rotating cylinder 501. Rotary encoder 504 outputs a series of electrical pulses that linearly depend on the angular displacement of cylinder 501 about the rotation axis 502. That is, the more pulses there are, the more the cylinder 101 is displaced.

IAA 505 is positioned opposite a portion of the envelope of cylinder 501, to acquire an image thereof. IAA 505 is moveable in the 'X-Z' plane by servomotors 506 and 507, respectively. Servomotors 504, 506 and 507 are controlled by three-dimension ("3D") motion controller 508. Controller 508 may be, for example, a Fanuc, Mitsubishi, ASC or Mega—F motion controller, which is functionally coupled to Computer 509. IAA 505 may be moved in the 'Z' direction for accommodating for changes in the diameter of printing cylinders and, in one embodiment of the disclosure, for optimizing the 'depth of field' of the image acquiring system substantially through out the image acquiring stage(s).

Computer 509 controls 3D controller 508 to cause controller 508 to rotate cylinder 501 and IAA 505 to required positions, depending on the actual stage of the visual inspection of cylinder 501. Computer 509 receives feedback signals, 510 and 511, to confirm to computer 509 that cylinder 501 and the IAA 505, respectively, are in the designated position and ready for the next image pickup by IAA 505. Computer 109 translates the series of pulses (shown at 510) into corresponding relative 'Y' coordinate, and the signal 511 into corresponding 'X' coordinate.

In order to acquire an image of a specific portion of cylinder 501 (a portion of interest) computer 509 instructs controller 509 to rotate cylinder 501 and to move IAA 505 essentially to the same X-Y coordinates and, if required, to move IAA 505 in the Z direction to get an optimal spacing, in the optical sense, between IAA 505 and the portion of interest. By "optimal spacing" is meant the spacing most suitable for acquiring an image of the portion of interest. IAA 505 may zoom-in or zoom-out to obtain the best possible image.

IAA 505 may transfer images to computer 509 of portions along a strip on the envelope of cylinder 505, which strip may be parallel to the rotation axis 502, or it may not be parallel to axis 502. Then, computer 509 causes controller 108 to rotate cylinder 501 further, to the next image pickup position, and causes IAA 505 to transfer to computer 509 images of the consecutive strip. The latter process may be repeated as many times as required to obtain images of the printing areas on cylinder 501. The picked-up, or acquired, images are transferred to computer 509, which seamlessly combines the individual images to one image. Cylinder 501 may include a fiducial indicia (a reference mark), the image of which may be forwarded by IAA 505 to computer 509 for calibrating the defects detection system.

Image sensor controller ("ISC") 512 may interface between computer 509 and IAA 505. Computer 509 may instruct IAA 505, through ISC 512, to acquire an image at the correct timing, after which IAA 505 may transfer the acquired image to computer 509, via ISC 512. ISC 512 may instruct a lighting source (not shown), which may be carried by, and moved with, IAA 505, to provide the proper lighting conditions required when specific images are acquired. That is, the system may adapt the lighting conditions to the expected type of defects.

Computer 509 may have, as input, a data file that relates to various cylinder information and parameters, such as physical dimensions and fabrication step (relevant, for example, to the lighting conditions and type of image analysis). Computer 509 may also have as input a data file of the patterning scheme of interest, which will serve as a reference data against which acquired images may be compared to detect thereby defects. Computer 509 may also have as input a data relating to fiducial indicia, such as an initial position on the tested cylinder, and a source file (bitmap). The source file is a computer's data file generated by the cylinder manufacturer and used for the generation of the printing pattern. The source file may contain binary data of the pattern to be printed and alignment fiducial indicia. Computer 509 may output data relating to: substantially full image of the entire peripheral surface of cylinder 501, at the different fabrication stages; defects map; defects list and details thereof, defects images; marking (option) and circumference measurements of the cylinder 501 under test. By 'marking' refers to use of information for the identification of the pattern, cylinder, shape or dimension (circumference) of the cylinder. Computer 509 may output the above-described information as data file. Alternatively, or additionally, computer 509 may use a graphical user interface (GUI) to display the data on a display screen. An exemplary GUI is described in connection with FIG. 11.

As known in the printing industry, a multi-color print is made by using different printing cylinders, such as cylinder 501, each of which is used for printing a different color. Accordingly, every cylinder involved in a specific print job must meet strict quality requirements, as explained hereinbefore. Therefore, computer 509 may be configured to simulate a printing job based on the association between defects of the involved printing cylinders and the print job. For this purpose, computer 509 may have as input the color intended for each printing cylinder. For example, computer 509 may be advised that the color of cylinder 501 is blue.

Figure 7:
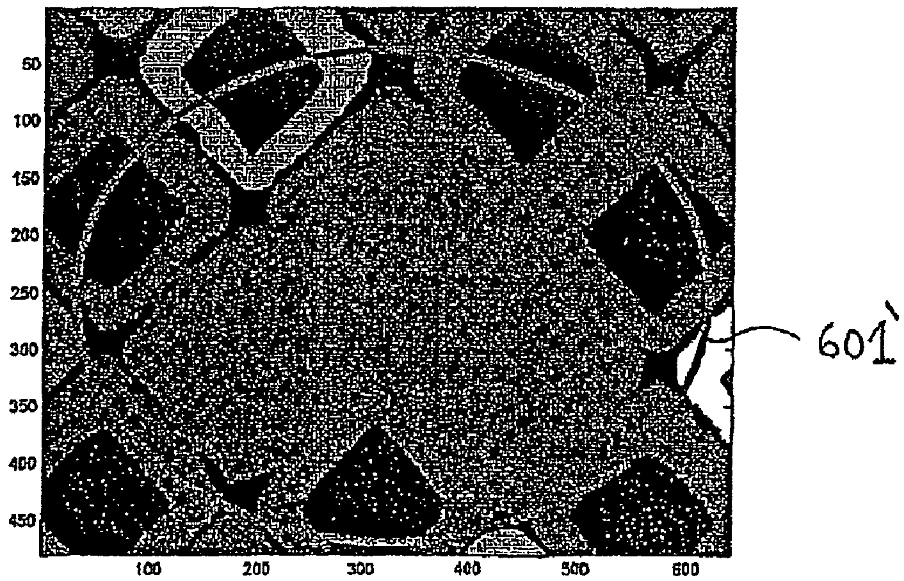
FIG. 7 shows a processed image of the acquired image of FIG. 6, which was obtained by employing morphology analysis on the image in accordance with some embodiments of the disclosure.
Figure 8:
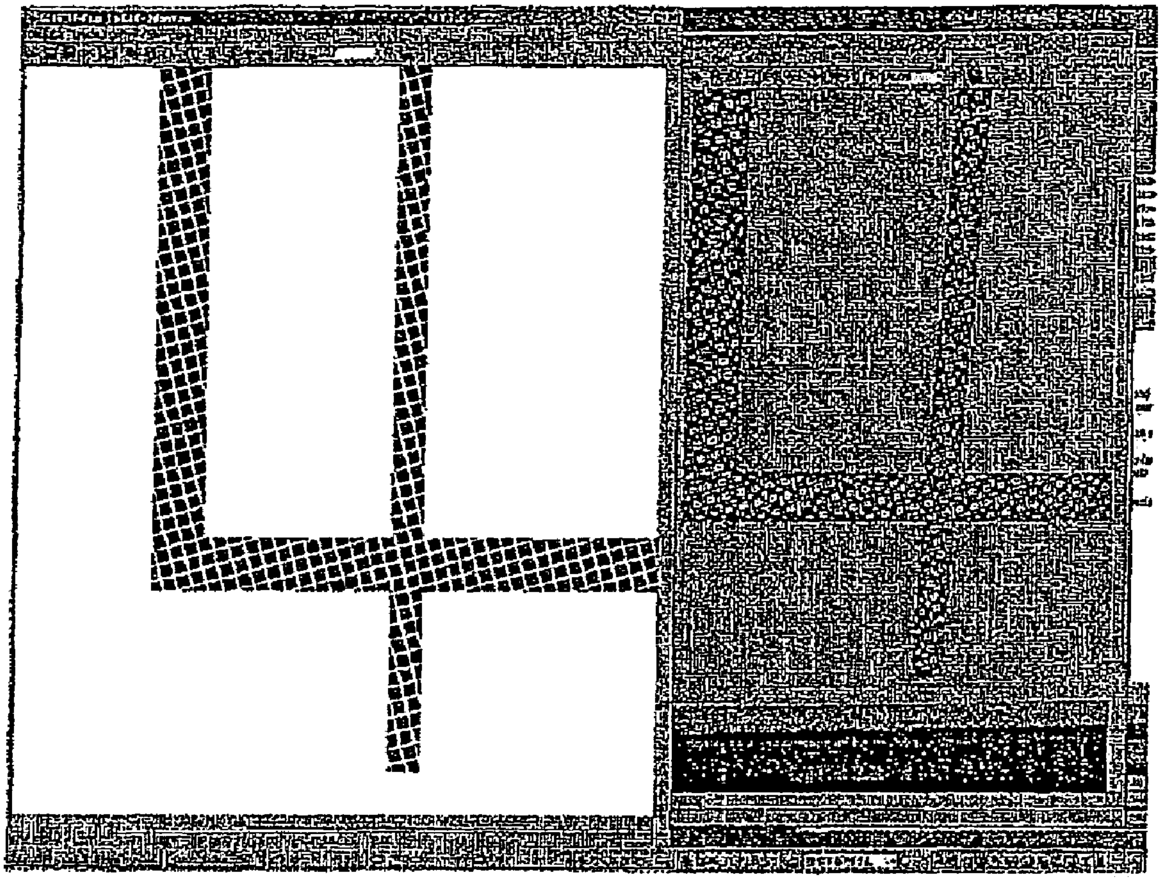
FIG. 8 shows an exemplary group of cells that corresponds to the digit '4' (on the left-hand side of the display screen) and a processed image thereof (on the right-hand side of the display screen), according to embodiments of the disclosure.
Figure 9:
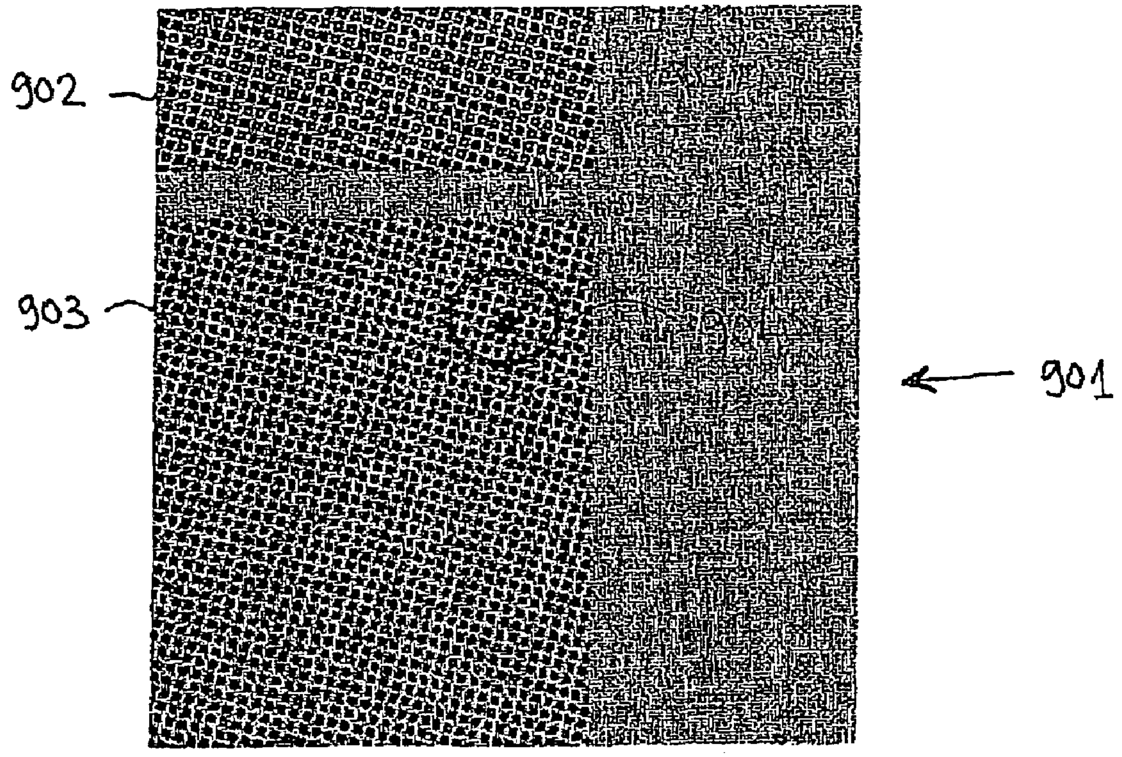
FIG. 9 shows an exemplary defect in a group of cells, according to embodiments of the disclosure.
Figure 10:
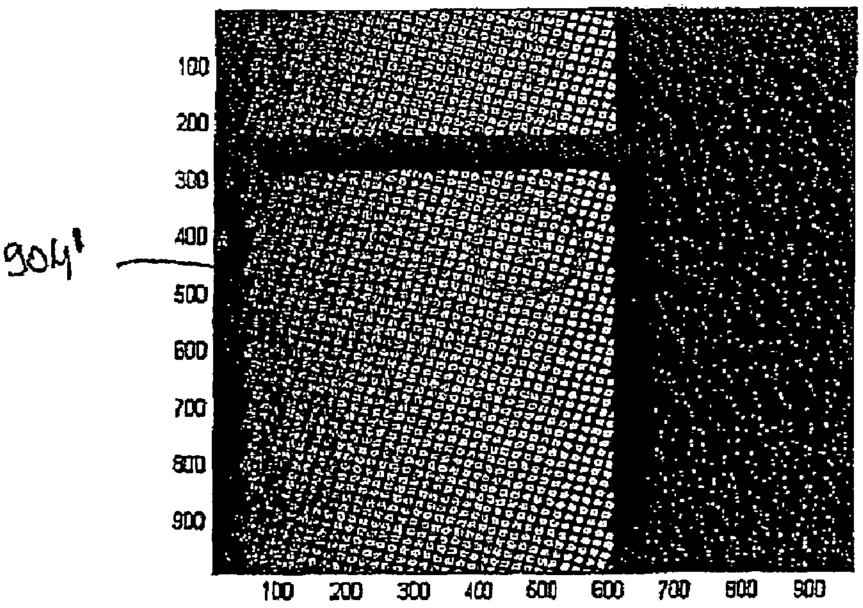
FIG. 10 shows a processed image of the image of FIG. 9, in accordance with some embodiments of the disclosure.

The simulation process may include superimposing the differently "colored" cells and defects of the different printing cylinders, and printing a test color printout based on the superimposed cells. If no defects are detected in any of the printing cylinders, the color printout is highly expected to resemble the patterning scheme. If, however, one or more major defects have been detected, the color printout may not be satisfying and a decision may have to be reached regarding whether to fix the defective cylinder(s) or to fabricate new cylinder(s). FIGS. 7, 8 and 10 show, according to some embodiments of the disclosure, processed images of exemplary group of cells for detecting defects in these cells, the images of which are shown in FIGS. 6, 8 and 9, respectively.

Figure 6:
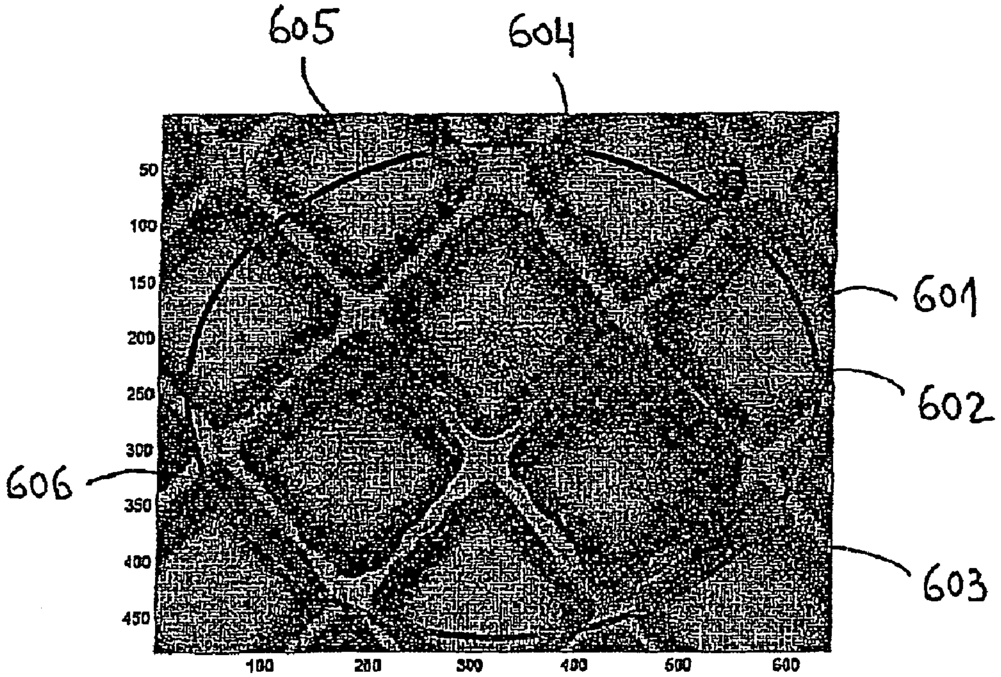
FIG. 6 shows a group of cells and good and poor quality walls therebetween, the poor quality walls being surrounded by an ellipse-shaped line (for illustration purpose only)

Turning now to FIG. 6, it shows, in accordance with some embodiments of the disclosure, a group of defective cells (surrounded by ellipse line 601, for convenience). As shown in FIG. 6, there are walls between cells that are very thin, which means that the related cells do not conform to the required cells' characteristics. Therefore, these cells may degrade the quality of the printing cylinder if located in critical areas in respect of the patterning scheme. For example, the wall between cells 602 and 603 is very thin, whereas the wall between cells 604 and 605 is nearly perfect. The wall between cells 604 and 606 is also defective.

Turning now to FIG. 7, it shows, in accordance to embodiments of the disclosure, a processed image of the group of cells shown in FIG. 6. The processed image of FIG. 7 was obtained by employing morphology analysis on the acquired image of the cells shown in FIG. 6. Cells 603, 604 and 606 do not conform to the expected cells' characteristics (in this case in terms of wall thickness) and, therefore, they are shown in FIG. 7 (circumvented by ellipse 601') 'connected' to one another; that is, after performing the morphology analysis.

Turning now to FIG. 8, it shows, in accordance with embodiments of the disclosure, an exemplary group of cells that corresponds to the digit '4' (on the left-hand side of the display screen) and a processed image thereof (on the right-hand side of the display screen).

Turning now to FIG. 9, it shows, in accordance with embodiments of the disclosure, an exemplary portion of the image carrier 901, which includes two groups of cells, 902 and 903. Group of cells 903 is shown including a defect (circumvented by circle 904, for convenience). Referring to FIG. 10, it shows, in accordance with embodiments of the disclosure, a processed image of the portion of image carrier 901 of FIG. 9. Defect 904 (FIG. 9) has been detected (circumvented by circle 904) in the processed image shown in FIG. 10, in accordance with embodiments of the disclosure.

Figure 11:
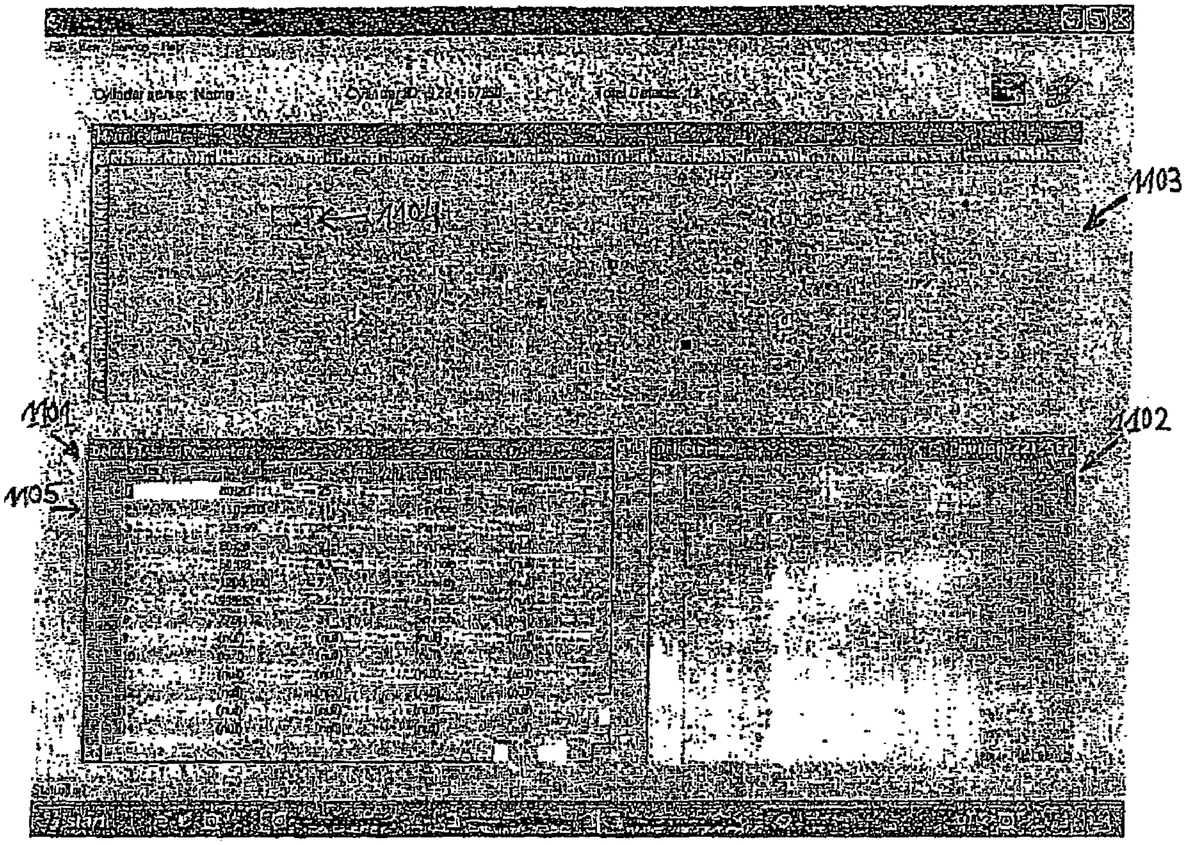
FIG. 11 shows an exemplary graphical user interface (GUI) in accordance with some embodiments of the disclosure.

Turning now to FIG. 11, it shows, in accordance with embodiments of the disclosure, an exemplary graphical user interface (GUI) for allowing an operator/viewer to operate the system of FIG. 5 and for displaying to the viewer a map (for example map 1103) of the defects detected in the polished image carrier, photoresist layer (wherever applicable), cells, and the wear-proof layer that protects the image carrier from abrasion.

In one embodiment, the system according the disclosure may further include a GUI to display a picture of the defects. In another embodiment, the GUI may provide processed data related to the defects. In another embodiment, the processed data related to the defects may include a list of the defects, size of the defects, distribution of the sizes of the defects, shapes of the defects, the influence of the defects on the quality of the printing picture or any combination thereof.

In one embodiment of the disclosure, the GUI may display to the viewer a picture of an inspected surface, or portions thereof, with defects thereon, including a list (for example list 1101) that specifies their positions and associated data (for example defect type and size, defects' 'X-Y' coordinates, and so on.). List 1101 may also include a factor for indicating the relevancy of each one of the defects. The GUI may allow the viewer to perform 'zoom-in' and 'zoom-out' and see the results in a screen such as screen 1102. The GUI may also allow the viewer to navigate from one area to another area on the surface of cylinder 501. The navigation operation may be carried out by dragging the picture (shown at 1103), and the dragging may be implemented, for example by use of a computer mouse or arrows/buttons on a "touch screen" type display.

The viewer may choose to zoom into defect 1104, by clicking on the vicinity of the defect 1104, after which the defected 1104 will be displayed 'magnified' in screen 1102. The viewer may select from list 1101 a defect which is suspected as a major defect, after which the defect of interest will be shown "magnified" in screen 1101.

The viewer may select one of several options associated with the types and characteristics of the detected defects. For example, the viewer may cause the GUI to show him every defect; i.e., regardless of its location, type and/or size, or defects having specified characteristics. For example, the viewer may instruct the GUI to display only defects having a size between 5 and 20 microns. According to another example, the viewer may instruct the GUI to display only defects having at least length, diameter or circumference greater than 20 microns. According to another example, the viewer may instruct the GUI to display only defects residing within the intended printing area, or outside the intended printing area. In addition, the viewer may instruct the GUI to display defects associated with the polished surface of the image carrier, and/or with the cells, and/or with the wear-proof layer and/or with the pattern-generating layer.

Every defect occurred during the fabrication process of the printing cylinder 501 may be recorded and analyzed, and the defects displayed to the viewer may be selected from the recorded/analyzed defects based on the viewer selections, or preferences. Alternatively, only defects of interest may be recorded and analyzed, from which defects may be displayed to the viewer based on his selections or preferences.

Inspection of Printing Cylinders in a Printing Environment

Since printing cylinders (and especially gravure cylinders) can be damaged easily, especially when shipped from an external manufacturing site or in-house manufacturing department to their final destination (usually a printing house or internal department), it is recommended that they will be inspected at the final destination, prior to them being inserted into the press-line or stored in the printing house. Such an inspection is herein referred to as "incoming inspection". Occasionally, there is a need in the printing industry to periodically fetch stored printing cylinders for re-use. Due to their sensitivity to storage and handling conditions, it is also recommended that printing cylinders be re-inspected before they are re-used.

By "inspection" is meant herein acquiring an image of a given surface of a printing cylinder and determining or introducing (such as by displaying) the location, nature and characteristics of defects associated with that surface. Inspection of a printing cylinder can be done during the printing cylinder fabrication process and in the printing process. By "in the printing process" is not meant inspection of the printing cylinder while the printing cylinder is engaged in a printing task but, rather, it is meant inspection of the printing cylinder at the printing site occasionally or before the printing cylinder is installed in, or inserted into, the press-line.

Inspection of a Printing Cylinder During the Printing Cylinder's Fabrication Process This kind of inspection can be implemented after polishing the copper coating of the printing cylinder and/or after engraving cells in or through the copper layer before or after coating the cells with chrome. Inspection of a printing cylinder after polishing its copper coating provides surface defects, and inspection of copper or chrome-coated engraved cells provides printing data defects which are defects associated with the actual cells pattern and characteristics.

Surface defects may include defects that are caused by, or during, the manufacturing or handling process, and which may cause cells to be ill engraved or badly engraved and the engraving stylus to be damaged. There might be other "surface" defects and surface defects can appear in the literature under different names than the names given herein.

Data defects, which are associated with cells' pattern, generally can belong to one or two of the following categories: (1) Image Integrity, which refers to the correspondence of the entire engraved cells as a whole image to the design data (the intended or planned printout), or/and (2) Cell Quality, which refers to the deviation of the shape and volume (depth) of each cell from the ideal shape and volume, respectively, such that the ink quantity in a cell is as planned.

Inspection of a Printing Cylinder in the Printing Process

This kind of inspection is implemented "on-site" (usually in a printing house) either as an incoming new cylinders ("reception") inspection or after fetching a printing cylinder from storage for (re-)use in reprint(s). Sometimes, several (up to 10) printing cylinders are used in a common print job. In such cases, each one of the several printing cylinders typically has a different task (color separation) in the generation of a final printout. For example, one printing cylinder may be used to print blue objects, whereas another printing cylinder may be used to print red objects in the same printout. All or some of the several printing cylinders can be retrieved and inspected before it/they are used or re-used. While on-site, printing cylinders can be inspected both for surface defects and data defects.

Like in the first case ("Inspection of a printing cylinder during the production process"), three kinds of inspections can also be employed in the second case ("Inspection of a printing cylinder in the printing process"):

1. Cylinder quality inspection, which refers to the inspection of surface defects in the newly manufactured printing cylinder (with Chrome surface as a protective coating) before installing the printing cylinder in the print press and/or after it is retrieved from, or stored in, a storage place;
2. Cells quality inspection, which refers to the inspection of geometry, shape, depth and regularity (indicative of cell volume) of individual engraved cells; and
3. Image integrity inspection, during which inspection the customer's digital file (the printout file to be printed by using one or more printing cylinders) and the pattern obtainable by the cells engraved on the printing cylinder are compared.
   Scaling coefficients between the digital file image and scanned image(s) may be calculated and used to perform image registration; that is, to align images. Suspected defect may be verified or validated by comparing some or all of their extracted features to a corresponding data file.

Inspection may include acquiring two-dimensional (2-D) image data or three-dimensional (3-D) image data, or a combination of 2-D and 3-D image data and using the 2-D or 3-D (or a combination thereof) for determining and classifying defects. When inspecting for surface defects, the pattern to be engraved (which may be stored in a related storage array or memory device) can be used to determine whether a detected surface defect resides in an area that is intended to be occupied by engraved cell(s). Based on such determination, a decision may be reached, as to whether the printing cylinder should be repaired or reworked.

Likewise, image integrity inspection may include comparison of the engraved pattern to the customer's printout digital file. The comparison may be done per cylinder or per group of cylinders that constitute a print job, for example by comparing registration of the area(s) of interest between all cylinders, for example for checking that all images (including the engraved cells) of all the printing cylinders constituting a single print job are perfectly, or near perfectly, aligned. Inspection of the image integrity may include the following inspection steps:

1. Optical or visual scanning of the cylinder's area of interest to acquire a corresponding image data;
2. Image processing of the acquired image data for producing defect calls;
3. Automatic verification of the defect calls, by re-scanning specific regions of interest around the defect calls, using either the same or different scan parameters (for example using the same or different resolution, illumination, and so on); and
4. Manual verification, by a human operator.

Depending on the circumstances, each inspection step may include several sub-steps, and the inspection process as a whole may include additional inspection steps.

Inspection data may be obtained using an optical or a visual inspection system or a combination of optical (or visual) inspection system and additional imaging system(s) such as ultrasound imaging system, Eddy current sensing system or X-Ray imaging system. Each of the imaging system (or a combination of imaging systems) may be used either for obtaining an initial image data and/or in the verification stage; that is, for verifying the initial image data.

While certain features of the disclosure have been illustrated and described herein, many modifications, substitutions, changes, and equivalents will now occur to those skilled in the art. It is, therefore, to be understood that the appended claims are intended to cover all such modifications and changes as fall within the true spirit of the disclosure.

What is claimed is:

1. A printing cylinder inspection process for detection of defects on an engravable material, the material being the peripheral surface of a printing cylinder, the process comprises:

optical or visual scanning and image acquiring of an area of interest of the printing cylinder;

processing data related to the acquired image(s) to obtain defect calls; and automatic verification of defect calls by optically re-scanning selected areas of interest around the defect calls.

2. The process according to claim 1, wherein the inspection of the printing cylinder in done in the printing process.

3. The inspection process according to claim 1, wherein the inspection is an incoming inspection.

4. The inspection process according to claim 1, wherein the inspection is done after fetching a printing cylinder from storage or before re-using a printing cylinder.

5. The process according to claim 1, wherein the inspection is associated with printing data defects or surface defects selected from a group comprising: inclusion, scratch, dish-down, pinhole, pimple or negative pinhole.

6. The inspection process according to claim 5, wherein a printing data defect may be associated with image integrity or cell quality, or with both image integrity and cell quality.

7. The inspection process according to claim 4, wherein defects are classified using two-dimensional image data, three-dimensional image data, or a combination thereof.

8. The inspection process according to claim 1, further comprising determining whether a surface defect resides within an area that is intended for engraved one or more cells.

9. The process according to claim 1, wherein the automatic verification comprises using the same or different scanning parameters(s) selected from a group comprising: illumination scheme, wavelength, resolution, and shutter speed.

10. The inspection process according to claim 1, further comprising manual verification of defect calls.

11. The inspection process according to claim 1, wherein inspection is performed using an optical or visual inspection system, with or without additional imaging systems.

12. The process according to claim 11, wherein an additional imaging system is selected from a group comprising: Ultrasound system, Eddy current sensing system, and X-ray system.

13. The process according to claim 12, wherein an additional imaging system may be used for initial scanning or in the automatic verification stage.

* * * * *